(12) United States Patent
Danchi

(10) Patent No.: US 12,466,773 B2
(45) Date of Patent: Nov. 11, 2025

(54) MULTIFUNCTIONAL AGRICULTURAL COMPOSITION AND METHOD FOR PREPARATION THEREOF

(71) Applicant: Hubert Dadie Danchi, Des Moines, WA (US)

(72) Inventor: Hubert Dadie Danchi, Des Moines, WA (US)

( * ) Notice: Subject to any disclaimer, the term of this patent is extended or adjusted under 35 U.S.C. 154(b) by 0 days.

(21) Appl. No.: 19/047,671

(22) Filed: Feb. 7, 2025

(65) Prior Publication Data

US 2025/0178982 A1    Jun. 5, 2025

(51) Int. Cl.
| | |
|---|---|
| C05F 11/08 | (2006.01) |
| A01N 63/23 | (2020.01) |
| A01N 65/18 | (2009.01) |
| A01N 65/26 | (2009.01) |
| A01N 65/40 | (2009.01) |
| A01P 3/00 | (2006.01) |
| A01P 7/04 | (2006.01) |
| C05G 3/60 | (2020.01) |

(52) U.S. Cl.
CPC .............. *C05F 11/08* (2013.01); *A01N 63/23* (2020.01); *A01N 65/18* (2013.01); *A01N 65/26* (2013.01); *A01N 65/40* (2013.01); *A01P 3/00* (2021.08); *A01P 7/04* (2021.08); *C05G 3/60* (2020.02)

(58) Field of Classification Search
CPC ........... C05F 11/08; C05G 3/60; A01N 63/23; A01N 65/18; A01N 65/40; A01N 65/26; A01P 7/04; A01P 3/00
See application file for complete search history.

(56) References Cited

U.S. PATENT DOCUMENTS

| | | | | |
|---|---|---|---|---|
| 5,298,251 A | * | 3/1994 | Locke .................... | A01N 65/26 424/405 |
| 5,356,628 A | * | 10/1994 | Locke .................... | A01N 65/26 424/405 |
| 5,368,856 A | * | 11/1994 | Locke .................... | A01N 65/26 514/937 |
| 5,372,817 A | * | 12/1994 | Locke .................... | A01N 65/26 424/DIG. 8 |

(Continued)

FOREIGN PATENT DOCUMENTS

| | | | | |
|---|---|---|---|---|
| CA | 3215150 A1 | * | 4/2024 | ............. A01N 63/20 |
| CN | 106818471 A | * | 6/2017 | ............. A01N 65/00 |

(Continued)

*Primary Examiner* — Wayne A Langel
(74) *Attorney, Agent, or Firm* — Novel Patent Services LLC

(57) ABSTRACT

A multifunctional agricultural composition is disclosed. The multifunctional agricultural composition combines organic insecticides, organic fertilizers, and organic fungicides for providing a cost-effective and environmentally sustainable solution for improving crop yield and health. The multifunctional agricultural composition is a versatile composition designed for universal crop applications that provides broad-spectrum pest control while delivering consistent performance across diverse crop varieties and environmental conditions. The multifunctional agricultural composition effectively targets a wide range of agricultural pests, fungal pathogens, and nutrient deficiencies, thereby making it suitable for use in varied farming systems, including horticulture, field crops, and orchard management.

2 Claims, 1 Drawing Sheet

(56) References Cited

U.S. PATENT DOCUMENTS

| | | | | |
|---|---|---|---|---|
| 5,733,355 | A | * 3/1998 | Hibino | A23K 10/18 |
| | | | | 71/7 |
| 2018/0020607 | A1 | * 1/2018 | Flores | A01N 25/24 |
| | | | | 504/100 |
| 2021/0212250 | A1 | * 7/2021 | Hajduk | A01N 25/04 |
| 2024/0018064 | A1 | * 1/2024 | Wolf | C05F 11/08 |

FOREIGN PATENT DOCUMENTS

| | | | | |
|---|---|---|---|---|
| CN | 110122502 A | * | 8/2019 | A01N 33/22 |
| CN | 110628685 A | * | 12/2019 | A01N 63/00 |
| CN | 112930893 A | * | 6/2021 | A01N 43/90 |
| EP | 436257 A | * | 7/1991 | A01N 65/26 |
| JP | 2022512719 A | * | 2/2022 | C07D 401/14 |

* cited by examiner

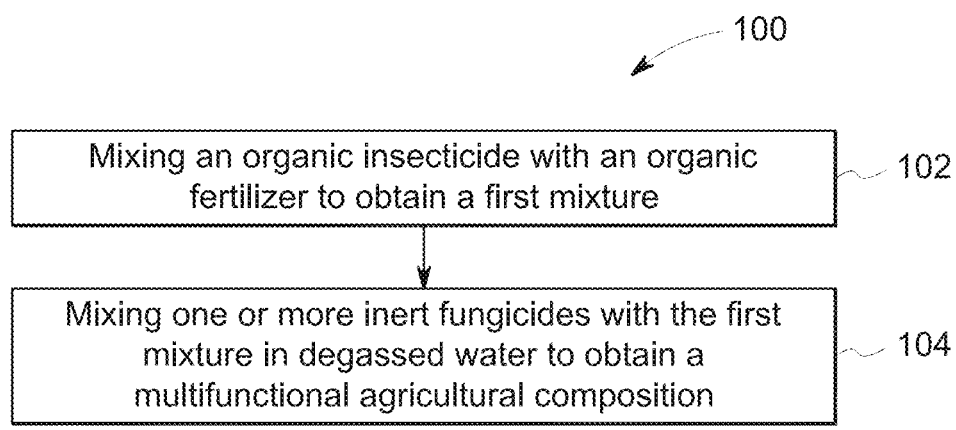

MULTIFUNCTIONAL AGRICULTURAL COMPOSITION AND METHOD FOR PREPARATION THEREOF

FIELD OF INVENTION

The present disclosure relates generally to agriculture and crop management, and more particularly to a multifunctional agricultural composition that combines organic insecticides, organic fertilizers, and organic fungicides, thereby providing a cost-effective and environmentally sustainable solution for improving crop yield and health.

BACKGROUND

Agriculture is the backbone of human civilization, providing food, raw materials, and livelihoods for billions worldwide. However, modern farming practices face significant challenges such as increasing pest infestations, soil fertility degradation, and the rise of resistant fungi and insects. These issues threaten sustainable food production, forcing farmers to rely heavily on chemical fertilizers, pesticides, and fungicides to maintain crop yields.

Extensive use of chemical insecticides leads to the development of resistance in many pests, rendering conventional methods ineffective and requiring higher doses of chemicals. Continuous reliance on synthetic fertilizers negatively impacts soil structure, reducing organic matter and microbial diversity essential for long-term fertility. Farmers are required to purchase separate products for fertilization, pest control, and fungal management, which significantly increases operational costs. The excessive use of chemical solutions leads to soil and water contamination, harming ecosystems and reducing biodiversity.

To overcome these challenges, farmers currently use a variety of chemical and organic products. Widely used to kill pests, synthetic pesticides provide rapid results but often contribute to resistance over time. Chemical fertilizers are used to replenish essential nutrients in the soil, supporting crop growth but often causing long-term soil depletion. Products like neem oil or microbial fertilizers (e.g., *Rhizobium* inoculants) provide eco-friendly alternatives but lack the combined efficacy needed to replace chemical-based methods. Chemical fungicides are used to prevent fungal infections, but they often lead to resistance and require frequent application.

However, farmers are required to invest in separate fertilizers, pesticides, and fungicides, which increases their financial burden and complicates farm management. Due to extensive use of chemical insecticides, pests and fungi become increasingly resistant to synthetic solutions, which necessitates the use of more potent and expensive chemicals. Chemical runoff from fertilizers and pesticides contaminates water bodies, harming aquatic life and posing health risks to humans. While organic options are environmentally friendly, they often lack the broad-spectrum effectiveness of chemical counterparts, requiring higher quantities and more frequent applications.

Therefore, there is a need for a multifunctional agricultural composition that is used to overcome all the above mentioned challenges while improving crop yield and pest control. There is also a need for a multifunctional agricultural composition that combines organic insecticides, organic fertilizers, and organic fungicides, thereby providing a cost-effective and environmentally sustainable solution for improving crop yield and health.

SUMMARY OF THE INVENTION

The following presents a simplified summary of one or more embodiments of the present disclosure to provide a basic understanding of such embodiments. This summary is not an extensive overview of all contemplated embodiments and is intended to neither identify key nor critical elements of all embodiments, nor delineate the scope of any or all embodiments.

The present disclosure, in one or more embodiments, relates to a multifunctional agricultural composition that provides a cost-effective and environmentally sustainable solution for improving crop yield and health.

An embodiment of a first aspect, the multifunctional agricultural composition comprises 20 to 25 weight percentage of an organic insecticide, 20 to 25 weight percentage of an organic fertilizer, 15 to 30 weight percentage of one or more inert fungicides, and 25 to 45 weight percentage of degassed water.

An embodiment of the first aspect, the organic insecticide comprises *Bacillus thuringiensis* at a concentration of at least, but not limited to, 135 million colony-forming units per gram (cfu/g).

An embodiment of the first aspect, the organic insecticide comprises *Bacillus subtilis* at a concentration of at least, but not limited to, 135 million cfu/g.

An embodiment of the first aspect, the organic fertilizer comprises microbial inoculants of *Rhizobium* at a concentration of at least, but not limited to, 135 million cfu/g.

An embodiment of the first aspect, the inert fungicides comprise at least one of neem oil, castor oil, and coconut oil.

An embodiment of a second aspect, a method for preparing the multifunctional agricultural composition is disclosed. The method comprises, at one step, the organic insecticide is mixed with the organic fertilizer to obtain a first mixture. Further, at another step, the inert fungicides are mixed with the first mixture in degassed water to obtain the multifunctional agricultural composition.

While multiple embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

The accompanying drawings, which are incorporated in and constitute a part of the specification, illustrate an embodiment of the invention, and, together with the description, explain the principles of the invention.

FIG. 1 illustrates a flowchart of a method for preparing a multifunctional agricultural composition, in accordance with embodiments of the invention.

DETAILED DESCRIPTION

Reference will now be made in detail to the present preferred embodiments of the invention, examples of which are illustrated in the accompanying drawings. Wherever possible, the same reference numerals are used in the drawings and the description to refer to the same or like parts.

FIG. 1 refers to a flowchart 100 of a method for preparing a multifunctional agricultural composition. The method comprises, at step 102, the organic insecticide is mixed with the organic fertilizer to obtain a first mixture. Further, at another step 104, the inert fungicides are mixed with the first mixture in degassed water to obtain the multifunctional agricultural composition.

In one embodiment herein, the multifunctional agricultural composition comprises 20 to 25 weight percentage of the organic insecticide, 20 to 25 weight percentage of the organic fertilizer, 15 to 30 weight percentage of the inert fungicides, and 25 to 45 weight percentage of degassed water.

In a preferred embodiment, the organic insecticide comprises *Bacillus thuringiensis* at a concentration of at least, but not limited to, 135 million colony-forming units per gram (cfu/g). In one embodiment, the organic insecticide comprises *Bacillus subtilis* at a concentration of at least, but not limited to, 135 million cfu/g. In some embodiment the organic insecticide comprises a combination of *Bacillus thuringiensis* and *Bacillus subtilis*.

In a preferred embodiment, the organic fertilizer comprises microbial inoculants of *Rhizobium* at a concentration of at least, but not limited to, 135 million cfu/g.

In one embodiment, a combination of *Bacillus subtilis, Bacillus thuringiensis*, and *Rhizobium*, provides broad-spectrum pest control, fungal prevention, and nitrogen fixation for improved soil health for growth of crop yield or plants. Co-inoculation of *Bacillus thuringiensis* with *Rhizobium* enhances biological nitrogen fixation and significantly improves plant growth parameters compared to inoculation with *Rhizobium* alone. The synergistic interaction between these microorganisms leads to increased nodule formation, enhanced shoot biomass, greater root development, and overall higher total biomass accumulation. The increased nodule formation promotes higher nitrogen assimilation. The enhanced shoot biomass results in improved vegetative growth. The greater root development facilitates better nutrient and water uptake.

In one embodiment, *Bacillus thuringiensis* exhibits multiple plant growth-promoting traits (PGP) comprise, but are not limited to, phytohormone production, biological nitrogen fixation and ammonia (NFH) production, phosphate solubilization, and siderophore and volatile organic compound production. *Bacillus thuringiensis* can be utilized for plant growth promotion and also as a bioremediation agent, offering potential applications in sustainable agriculture and environmental restoration. The application of *Bacillus thuringiensis*, in combination with plant growth-promoting bacteria (PGPB), or its metabolites in agricultural fields demonstrates significant benefits in pest control, viral disease suppression, and plant growth enhancement. The interaction between *Bacillus thuringiensis* and plant responses is highly strain- and environment-specific.

In a preferred embodiment, the inert fungicides comprise, but are not limited to, neem oil, castor oil, and coconut oil.

In one example embodiment, the multifunctional agricultural composition comprises 20 weight percentage of *Bacillus thuringiensis,* 5 weight percentage of *Bacillus* subtitles, 25 weight percentage of *Rhizobium,* 15 weight percentage of neem oil, 10 weight percentage of castor oil, 5 weight percentage of coconut oil and 30 weight percentage of degassed water.

In one embodiment, the multifunctional agricultural composition comprises castor oil, neem oil, coconut oil, *Bacillus subtilis, Bacillus thuringiensis*, and *Rhizobium* for providing enhanced pest control and soil fertility restoration.

In one embodiment, the multifunctional agricultural composition is a versatile composition designed for universal crop applications that provides broad-spectrum pest control while delivering consistent performance across diverse crop varieties and environmental conditions. The multifunctional agricultural composition effectively targets a wide range of agricultural pests, fungal pathogens, and nutrient deficiencies, making it suitable for use in varied farming systems, including horticulture, field crops, and orchard management.

In some embodiments, for application, 1 gallon (approximately 3.79 liters) of the concentrated multifunctional agricultural composition is diluted with up to 64 gallons (242 liters) of water or less, depending on the severity of pest infestations and soil fertility requirements. The diluted multifunctional agricultural composition is administered via drip irrigation systems for precise root-zone delivery or applied as a foliar spray to ensure uniform coverage of plant surfaces, enhancing its efficacy in pest suppression, fungal control, and nutrient absorption. This flexible application method allows farmers to optimize resource utilization while maintaining environmentally sustainable practices.

In one embodiment, the multifunctional agricultural composition is cost-effective, reducing the total expenditure on pest control, fungicides, and fertilizers by at least 30% compared to conventional practices.

In one embodiment, the multifunctional agricultural composition is applied to crops during a single agricultural process, thereby simultaneously achieving pest eradication, fungal prevention and nutrient enrichment of the soil. Castor oil, neem oil, coconut oil, *Bacillus subtilis, Bacillus thuringiensis*, and *Rhizobium* are environmentally safe, biodegradable, and do not contribute to soil or water contamination. The multifunctional agricultural composition is effective in a variety of soil types and climates, maintaining pest control and fertilization efficacy over a wide range of environmental conditions.

In one embodiment, a recommended application dosage of the multifunctional agricultural composition varies between 0.5 acre to 1 acre (approximately 0.00405 square kilometers), with the exact quantity depending on the specific crop type and its growth stage.

In one embodiment, for solution preparation, 1 gallon (3.785 liters) of the multifunctional agricultural composition concentrate is diluted in a volume of 400 to 800 gallons of water, ensuring appropriate nutrient delivery and coverage. The dilution ratio is determined based on the method of application. For an exemplary embodiment, foliar spraying requires a more diluted multifunctional agricultural composition to facilitate uniform leaf absorption and minimize the risk of phytotoxicity. For another exemplary embodiment, drip irrigation allows for a more controlled and gradual nutrient supply directly to the root zone, optimizing absorption efficiency. The dilution range ensures adaptability across various crop species and environmental conditions, optimizing nutrient uptake while preventing over-application or wastage.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principles of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

It will readily be apparent that numerous modifications and alterations can be made to the processes described in the foregoing examples without departing from the principles underlying the invention, and all such modifications and alterations are intended to be embraced by this application.

What is claimed is:

1. A multifunctional agricultural composition, comprising:

25 weight percentage of organic insecticides including 20 weight percentage *Bacillus thuringiensis* and 5 weight percentage *Bacillus subtilis;*

25 weight percentage of an organic fertilizer including microbial inoculants of *Rhizobium;*

30 weight percentage of inert fungicides including 15 weight % neem oil, 10 weight % castor oil and 5 weight % coconut oil; and 30 weight percentage of degassed water.

2. A method for preparing a multifunctional agricultural composition, comprising:

mixing 25 weight % of organic insecticide including 20 wt % *Bacillus subtilis* and 5 wt % *Bacillus thuringiensis* with 20-25 weight % of organic fertilizer including *Rhizobium* to obtain a first mixture; and mixing 30 weight % of one or more inert fungicides including 15 weight % neem oil, 10 weight % castor oil and 5 weight % coconut oil with the first mixture in 30 weight % degassed water to obtain the multifunctional agricultural composition;

wherein the *Bacillus subtilis, Bacillus thuringiensis* and *Rhizobium* are each at a concentration of 135 million colony-forming units per gram (cfu/g).

* * * * *